(12) United States Patent
Bong

(10) Patent No.: US 9,470,575 B1
(45) Date of Patent: Oct. 18, 2016

(54) WATER-COOLED COPPER SHOES

(76) Inventor: William L. Bong, Vallejo, CA (US)

(*) Notice: Subject to any disclaimer, the term of this patent is extended or adjusted under 35 U.S.C. 154(b) by 298 days.

(21) Appl. No.: 13/342,367

(22) Filed: Jan. 3, 2012

Related U.S. Application Data

(60) Provisional application No. 61/429,382, filed on Jan. 3, 2011.

(51) Int. Cl.
*G01H 1/00* (2006.01)
*G01H 1/04* (2006.01)

(52) U.S. Cl.
CPC . *G01H 1/00* (2013.01); *G01H 1/04* (2013.01)

(58) Field of Classification Search
CPC ......... B23K 9/18; B23K 9/182; B23K 9/184
USPC ............ 219/125.12, 73, 73.21; 162/153, 156
See application file for complete search history.

(56) References Cited

U.S. PATENT DOCUMENTS

| | | | | |
|---|---|---|---|---|
| 4,841,116 A * | 6/1989 | Kimura | .................. | B23K 9/038 219/73 |
| 6,207,920 B1 * | 3/2001 | Morlock | .............. | B23K 9/0026 219/137 R |
| 6,297,472 B1 * | 10/2001 | Bong | .................. | B23K 9/0203 219/125.12 |
| 2009/0294407 A1 * | 12/2009 | Bong | ..................... | B23K 25/00 219/73.1 |

* cited by examiner

*Primary Examiner* — Tu B Hoang
*Assistant Examiner* — Thomas Ward
(74) *Attorney, Agent, or Firm* — Charles L. Thoeming

(57) ABSTRACT

A water-cooled copper welding shoe adaptable to Electroslag or Electrogas welding applications reduces weld voltage, decreases the size of the weld nugget and, in turn, decreases the heat input from the welding application into the work pieces is disclosed. A water-cooled copper welding shoe embodiment adjusts in three dimensions to adequately contain the weld puddle and overcome miss-matched work piece surfaces.

8 Claims, 11 Drawing Sheets

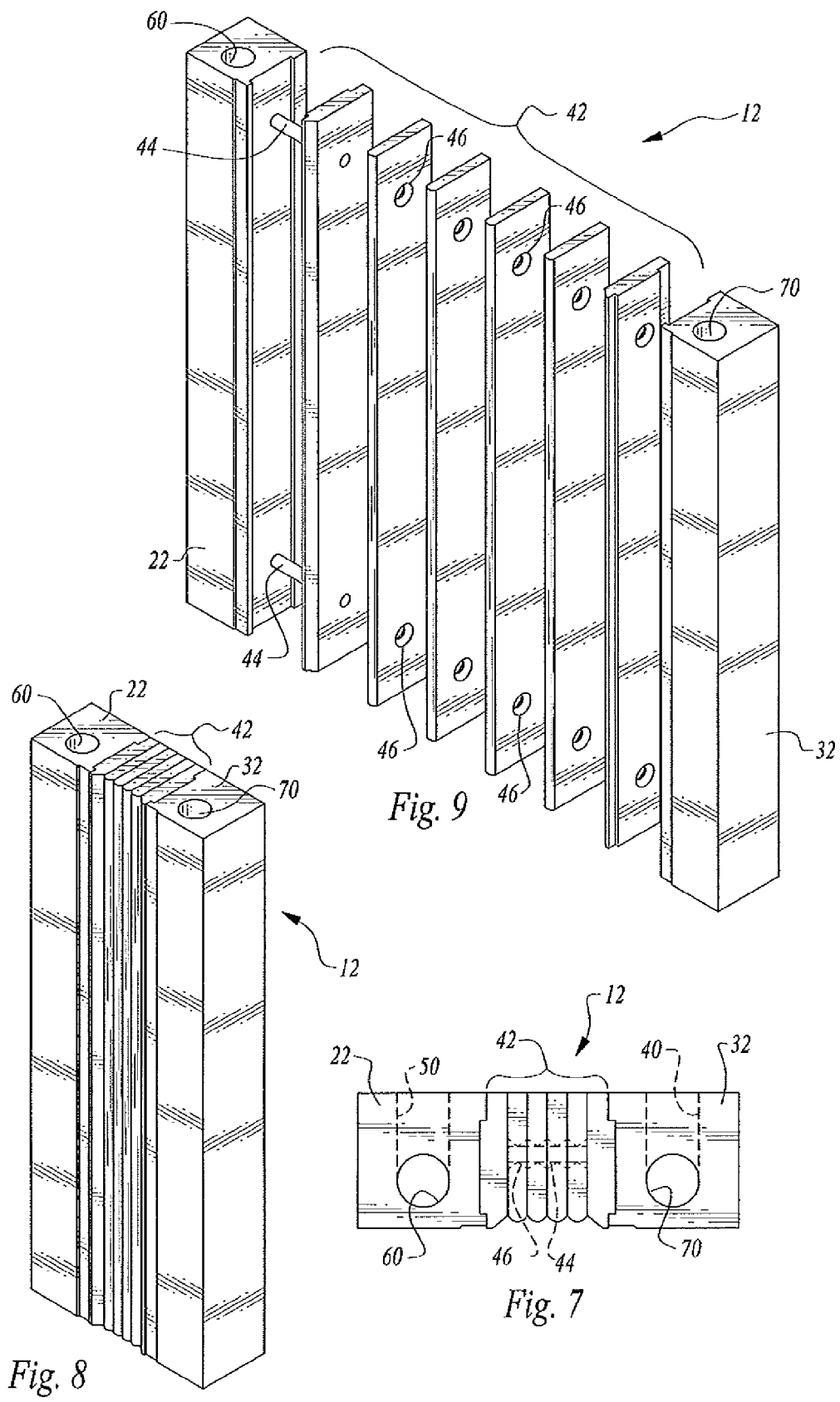

WATER-COOLED COPPER SHOES

CROSS-REFERENCES TO RELATED APPLICATIONS

This United States non-provisional patent application is based upon and claims the filing date of U.S. provisional patent application Ser. No. 61/429,382 filed Jan. 3, 2011.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BT-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates to welding. More particularly, the invention is related to water-cooled copper welding shoes for use in welding, particularly for vertical Electroslag and Electrogas welding applications.

2. Description of Related Art Including Information Disclosed Under 37 CFR 1.97 and 1.98

The following U.S. Letters Patent are incorporated by reference as if full set forth herein: U.S. Pat. No. 6,297,472 for Welding System and Method, issued Oct. 2, 2001 (the "'472 Patent"); U.S. Pat. No. 7,038,159 for Electroslag Butt-Welding Expansion Joint Rails, issued May 2, 2006 (the "'159 patent"); U.S. Pat. No. 7,148,443 for Consumable Guide Tube, issued Dec. 12, 2006 (the "'443 patent"); and U.S. Pat. No. 7,429,716 for Modular Welding System, issued Sep. 30, 2008 (the "'716 patent").

BRIEF SUMMARY OF THE INVENTION

Water-cooled copper welding shoes presently used for Electroslag and Electrogas welding applications keep the molten weld metal and flux bath contained in the weld cavity. Water circulates through the copper shoes at a flow rate of approximately 2 gallons per minute. This flow rate is sufficient to keep the copper shoes from melting from excessive heat. In consumable-guide electroslag welding, the shoes do not move. For longer joints the shoes are repositioned in a leapfrog manner, as welding continues upward. In non consumable guide-tube Electroslag or Electrogas welding the shoes move vertically upward with the Vertical Rate of Rise (VRR) of the molten weld puddle.

Arcmatic® VertaSlag® Butt-Weld and Tee-Weld Water-Cooled Shoes are either machined or extruded into the desired shape from pure Oxygen Free, High Conductivity pure Copper (OFHC-101). When extruded into shape, the extrusion die must provide an interior passage for water flow. A recess (0.125 inch deep by 1 inch wide) is designed into the face of each shoe to shape the weld reinforcement.

Chamfered edges are provided where the copper makes contact with the base material. These chamfered edges help the molten weld metal to wet against the parent material, to provide a smooth transition between the weld metal and the parent material. On conventional water-cooled copper shoes, each shoe has an National Pipe Thread Tapered Thread ("NPT") threaded hole on the input and output for connecting water circulation hose couplings. Internal threaded couplings are attached to the threaded holes and silver-soldered into position to prevent water leaks.

Holes are drilled and tapped into the back face of each water-cooled shoe. These threaded holes are to capture a steel, stainless steel, or aluminum backing plates that can be attacked to the back of the shoe to reduce wear. The VertaSlag® Butt-Weld and Tee-Weld Shoes are provided in a variety of lengths and widths. The most common being 3-to-4 inches wide and 3 to 24 inches long. Both Tee and Butt Shoes can be made in a variety of lengths.

The Arcmatic® water-cooled Butt-Weld and Tee-Weld shoes are used in pairs—one on either side of the welding joint. When placed against the parent material, cooling water should always enter the copper shoe from the bottom and exit from the top. Water flowing from bottom to top reduces the possibility of "vapor-lock" which could stop the flow of water.

To date the welding industry has preferentially used water-cooled copper shoes to make electroslag welds. The reason for this is that the molten Electroslag or Electrogas flux puddle is at temperatures of approximately 3500 degrees Fahrenheit during the welding operation. The molten steel being welded melts at a temperature of approximately 2300-to-2500 degrees Fahrenheit. Copper melts at approximately 1900 degrees Fahrenheit. If some form of cooling is not applied to the copper welding shoes, the temperature of the molten flux and molten steel will melt the copper.

Water-cooled Electroslag or Electrogas shoes do an excellent job in keeping the copper welding shoes from melting. In addition to keeping the copper welding shoes from melting, some welding engineers think it is necessary to use the water-cooled copper shoes for keeping the parent material from overheating. To accomplish this, the water-cooled copper shoes are manufactured at a minimum of four inches wide for narrow-gap Electroslag welding (originally referred to as NGI-ESW, now referred to as ESW-NG). The popular theory is that this water-cooled copper shoe width will keep the heat affected zone (HAZ) much smaller, allowing better physical characteristics for a better quality weld.

The 2010 addition of Narrow-Gap Electroslag or Electrogas welding (ESW-NG) to the American Welding Society ("AWS") D1.5 Bridge code requires that the input water temperature that enters the first water-cooled copper shoe and exits the last water-cooled copper shoe can only rise a maximum of 20 degrees Fahrenheit. To attain this standard requires a water flow of approximately 4-gallons per minute flow rate to maintain the temperature within the narrow limits of the AWS D1.5 code for ESW-NG welding. This excessive cooling of the base material on either side of the Electroslag weld joint also over chills the temperature of the weld puddle. This over chilling of the weld puddle makes it very difficult to melt the edges of the parent material nearest to the water-cooled welding shoes.

To have the temperature of the parent material high enough to melt the corners of the weld cavity requires excessively high voltage levels. For instance, a typical welding procedure for heavy plate may require 1000-Amps at 38-Volts. Therefore, the total wattage into the weld can be expressed by the product of Amperage times the quotient of Voltage divided by the travel speed. If the weld is traveling at 1.5 inches/minute (IPM), the heat input equation would be expressed as:

$$((Amps \times Volts \times 60)/(1000 \times 1.5\ IPM)) = Total\ Kilo\ Joules\ Input.$$

For example, for a 1000-Amps at 38-Volts: $(1000\text{-}A \times 38\text{-}V \times 60)/(1000 \times 1.5\text{-}IPM) = 1{,}520$ Kj/Inch, resulting in a calculated total of 1,520 Kilo Joules/Inch heat input into the weld. The reduction in heat input reduces the size of the weld nugget, and reduces base metal dilution from 50%, to approximately 30%.

The Arcmatic® tri-part water-cooled copper shoes (hereafter referred to as the "tri-part shoe"), and for the tri-part articulated water-cooled copper shoes (hereafter referred to as the "tri-part flex shoe"), use water-circulation to cool the two outer sections of the tri-part shoe and conductive cooling to remove heat from the center section of the tri-part shoe as the weld puddle progresses vertically upward. The two outside sections of the tri-part shoe come into intimate contact with the two pieces of parent material being joined together with the ESW-NG welding process, and the single center section of the copper shoe only comes in contact with the molten electroslag weld puddle.

While meeting or exceeding these efforts to reduce the size of the weld nugget, and reducing base metal dilution from 50%, to approximately 30%, the tri-part flex shoe also is designed to fit tightly against two "mis-matched" sections of parent material being joined together, and yet let the multi-part center sections flex in the X axis, the Y axis, and the Z axis to keep the shoe aligned with the weld joint, while simultaneously keeping the water-cooled section of the shoe in close contact with the parent material to reduce the size of the HAZ and reduce base metal dilution. This tight fit of the tri-part flex shoe also allows the two end portions of the tri-part flex shoe to saddle against the miss-matched plates preventing leakage of the molten, 3500 degrees Fahrenheit Electroslag or Electrogas flux puddle during the Electroslag and Electrogas welding operation.

During the Electroslag and Electrogas welding process, the two water-cooled sections of the copper shoe remain below 200° Fahrenheit. These two sections of the tri-part flex shoe provide conductive cooling for the center section of the shoe. The tri-part flex shoe center section heats up to a temperature range of approximately 200° Fahrenheit to 1000° Fahrenheit—while always remaining well below the melting temperature of copper. This differential in temperature between the outer sections of the tri-part flex shoe and the inner section(s) of the tri-part flex shoe allows the two water-cooled sections to subtract heat from the parent material, while allowing the center section(s) of the tri-part flex shoe to heat up. This heating action allows the molten electroslag welding puddle to maintain a temperature that is hot enough to melt the outer portions of the four corners of the weld cavity while the two section of parent material are being welded together.

If the center section of the tri-part copper shoes maintains a temperature range between 200° Fahrenheit to 1000° Fahrenheit during the welding operation, the welding voltage can be substantially lowered and still attain excellent wetting on the four corners of the parent material in the weld cavity without causing any damage to the center section(s) of copper of the tri-part flex shoe. At the same time, the water-cooled outer parts of the tri-part flex shoe are continually cooling the parent material to reduce the size of the Heat Affected Zone (HAZ) because, as previously mentioned, the weld voltage is reduced from 38-volts to 30-Volts. This is a reduction in total wattage into the parent material of 8000 Watts.

This heat reduction will result in the ability of welding faster, with a smaller HAZ and far less base metal dilution. A weld at 1000-Amps and 38-Volts will produce approximately 50% base material, while a weld at 1000-Amps and 30-Volts will produce approximately 30% base metal dilutions. Lower heat input, faster travel speeds, and lower base metal dilution will 1) result in a smaller grain structure in the weld and a much stronger bond in the fusion zone of the weld, 2) reduce weld voltage, 3) decrease the size of the Electroslag or Electrogas weld nugget and, in turn, decrease the heat input from the Electroslag or Electrogas welding application into the work piece by means of the tri-part and tri-part flex water-cooled cooper welding shoes.

Other features, advantages, and objects of the present invention will become apparent with reference to the following description and accompanying drawings. These together with other objects of the invention, along with the various features of novelty that characterize the invention, are described with particularity in the claims attached to and forming a part of this disclosure. For a better understanding of the invention, its operating advantages and the specific objects attained by its uses, reference should be made to the attached drawings and descriptive materials in which there are illustrated preferred embodiments of the invention.

DESCRIPTION OF THE SEVERAL VIEWS OF THE DRAWINGS

These and other features, aspects, and advantages of the present invention will become better understood with regard to the following description, appended claims, and accompanying drawings as further described.

FIG. 1 is a drawing of the ESW-NG process and assembly depicting a side view of the parent material, the molten flux puddle and the molten metal puddle, along with the location of the guide tube and welding wire in relationship to the molten welding puddles between parent material to be welded together and the run-off sump.

FIG. 7 is a top view of the embodiment of tri-part flex water-cooled copper Electroslag or Electrogas welding shoe 12, depicting generally a first water-cooled segment 22 having a copper plug 60 and a water outlet manifold 50, a plurality of solid copper flex shoe segments 42, a second water-cooled segment 32 having a copper plug 70 and a water outlet manifold 40. Dotted lines show the center pin 44 in alignment holes 46 of the tri-part flex shoe segments 42 that allows the tri-part flex shoe segments 42 to maintain alignment as the tri-part flex water-cooled copper Electroslag or Electrogas welding shoe 12 forms against irregular surfaces on the X, Y and Z axes of two steel plates on either side of a weld cavity.

FIG. 8 is a front top isometric view of the embodiment of tri-part flex water-cooled copper Electroslag or Electrogas welding shoe of FIG. 7.

FIG. 9 is an exploded view of the embodiment of tri-part flex water-cooled copper Electroslag or Electrogas welding shoe of FIG. 8.

DETAILED DESCRIPTION OF THE INVENTION

Figure 1A:
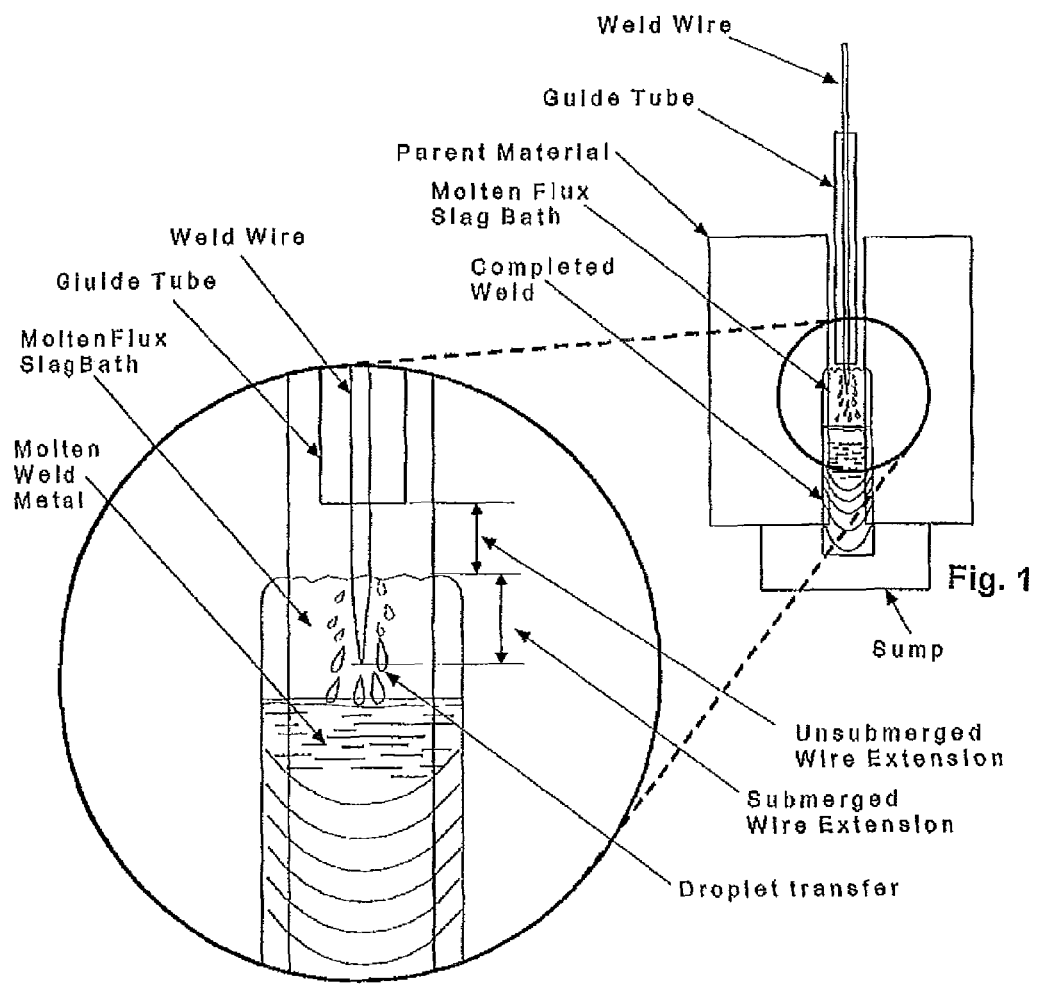
FIG. 1A is an enlarged view of the dynamics of the process and assembly of FIG. 1, depicting relative spatial and positional relationships among the weld wire, guide tube, molten flux slag bath, and molten weld metal within the weld gap between parent material to be welded, and further depicting un-submerged and submerged weld wire extensions in relation to the molten weld metal, and droplet transfer from the molten flux slag bath to the molten weld metal.
Figure 2:
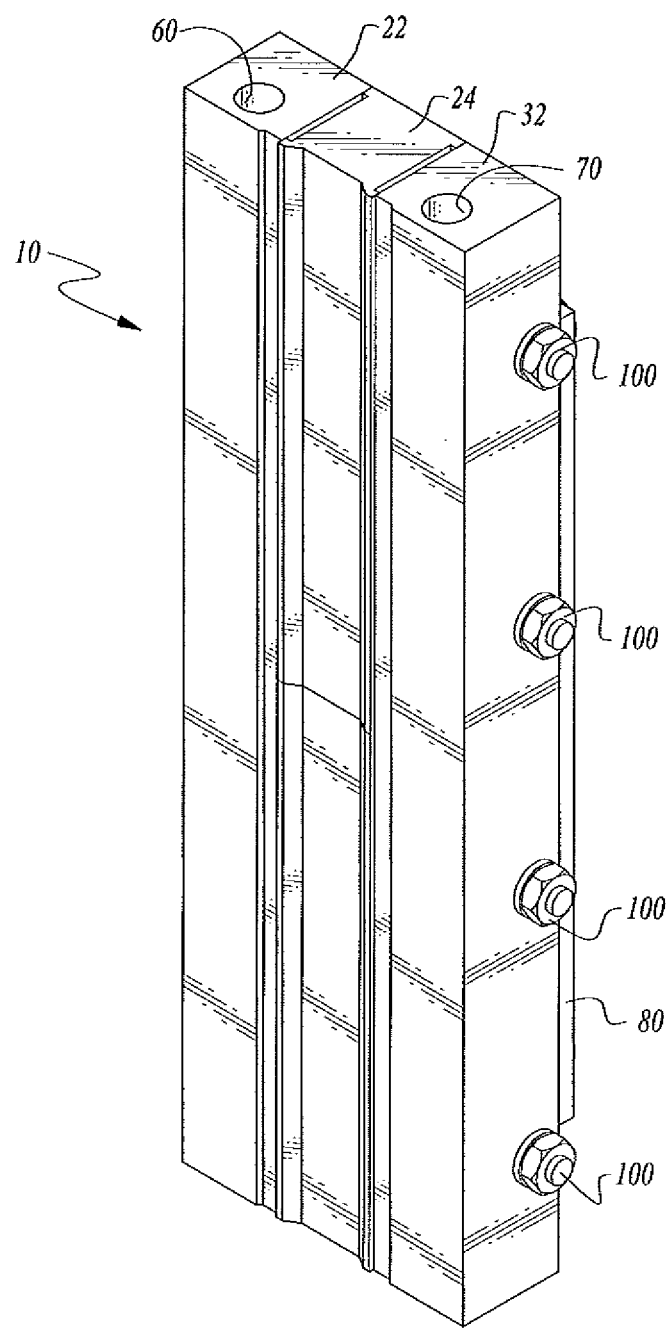
FIG. 2 is an front top isometric view of an embodiment of tri-part water-cooled copper Electroslag or Electrogas welding shoe 10, depicting generally a first water-cooled segment 22 having a copper plug 60, a solid copper central segment 24, a second water-cooled segment 32 having a copper plug 70, and a plurality of copper connector bolts 100 connecting the three segments of the tri-part water-cooled copper Electroslag welding shoe and securing the relative position of each segment to the other two segments without interfering with the water circulation functions of the first and second water-cooled segments, 22 and 32.
Figure 3A:
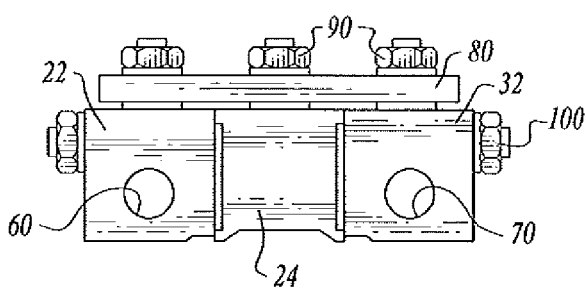
FIG. 3A is a top view of the embodiment of tri-part water-cooled copper Electroslag or Electrogas welding shoe 10 of FIG. 2, depicting generally a first water-cooled segment 22 having a copper plug 60, a solid copper central segment 24, a second water-cooled segment 32 having a copper plug 70, a partial portion of plurality of copper connector bolts 100 connecting the three segments of the tri-part water-cooled copper Electroslag welding shoe and securing the relative position of each segment to the other two segments, a backing plate 80, a plurality of copper connector bolts 90 connecting the backing plate 80 to the backward faces of the three segments of the tri-part water-cooled copper Electroslag welding shoe 10.
Figure 3:
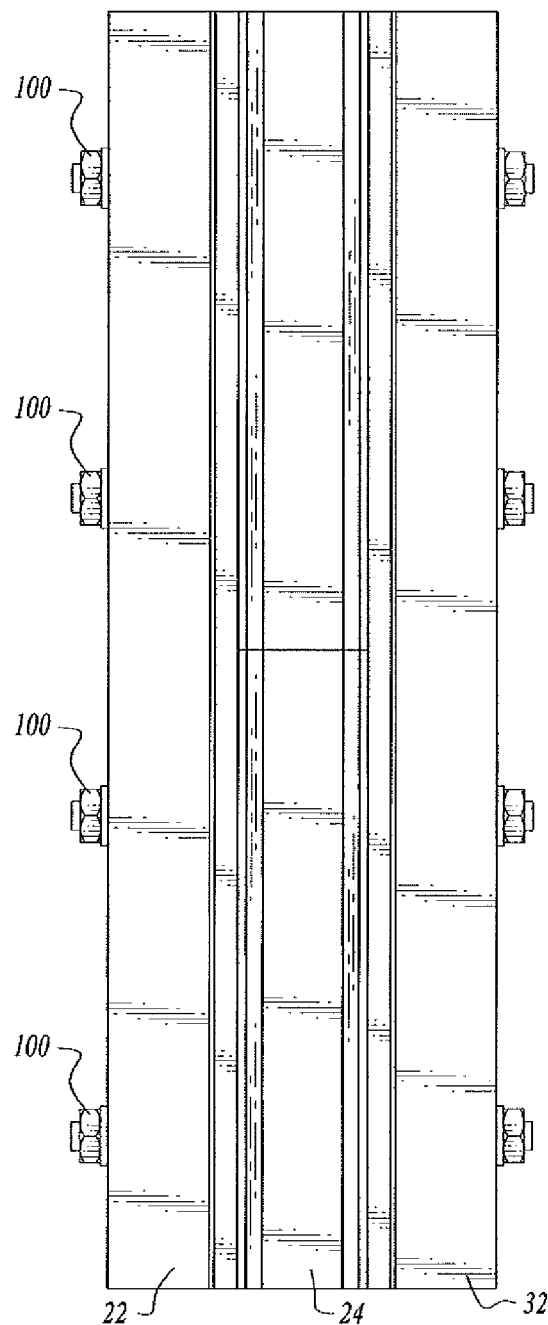
FIG. 3 is a front elevation view of the embodiment of the tri-part water-cooled copper Electroslag welding shoe 10 of FIG. 2, depicting generally a first water-cooled segment 22, a solid copper central segment 24, a second water-cooled segment 32, and a plurality of copper connector bolts 100 connecting the three segments of the tri-part water-cooled copper Electroslag or Electrogas welding shoe and securing the relative position of each segment to the other two segments.
Figure 4:
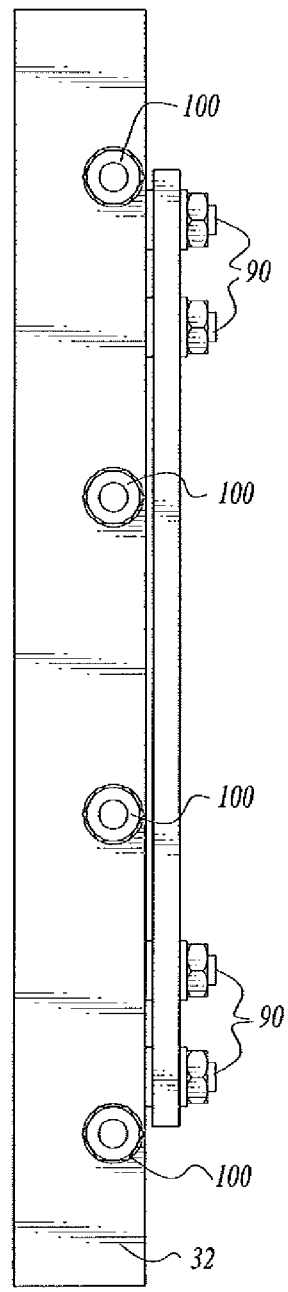
FIG. 4 is a right side view of the embodiment of the tri-part water-cooled copper Electroslag or Electrogas welding shoe 10 of FIG. 2, depicting generally a second water-cooled segment 32, a plurality of copper connector bolts 100 connecting the three segments of the tri-part water-cooled copper Electroslag welding shoe and securing the relative position of each segment to the other two segments, a backing plate 80, a plurality of copper connector bolts 90 connecting the backing plate 80 to the backward faces of the three segments of the tri-part water-cooled copper Electroslag welding shoe 10.
Figure 5A:
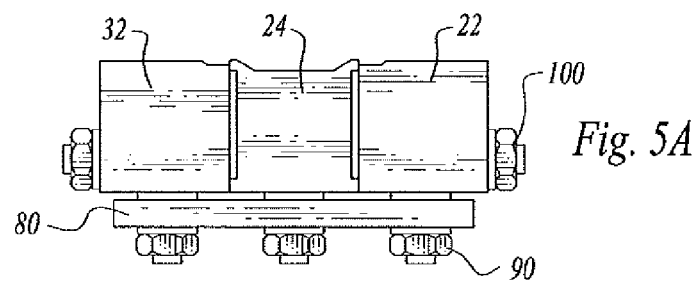
FIG. 5A is a bottom view of the embodiment of tri-part water-cooled copper Electroslag or Electrogas welding shoe 10 of FIG. 2, depicting generally a first water-cooled segment 22, a solid copper central segment 24, a second water-cooled segment 32, a plurality of copper connector bolts 100 connecting the three segments of the tri-part water-cooled copper Electroslag welding shoe and securing the relative position of each segment to the other two segments, a backing plate 80, a plurality of copper connector bolts 90 connecting the backing plate 80 to the three segments of the tri-part water-cooled copper Electroslag or Electrogas welding shoe 10.
Figure 5:
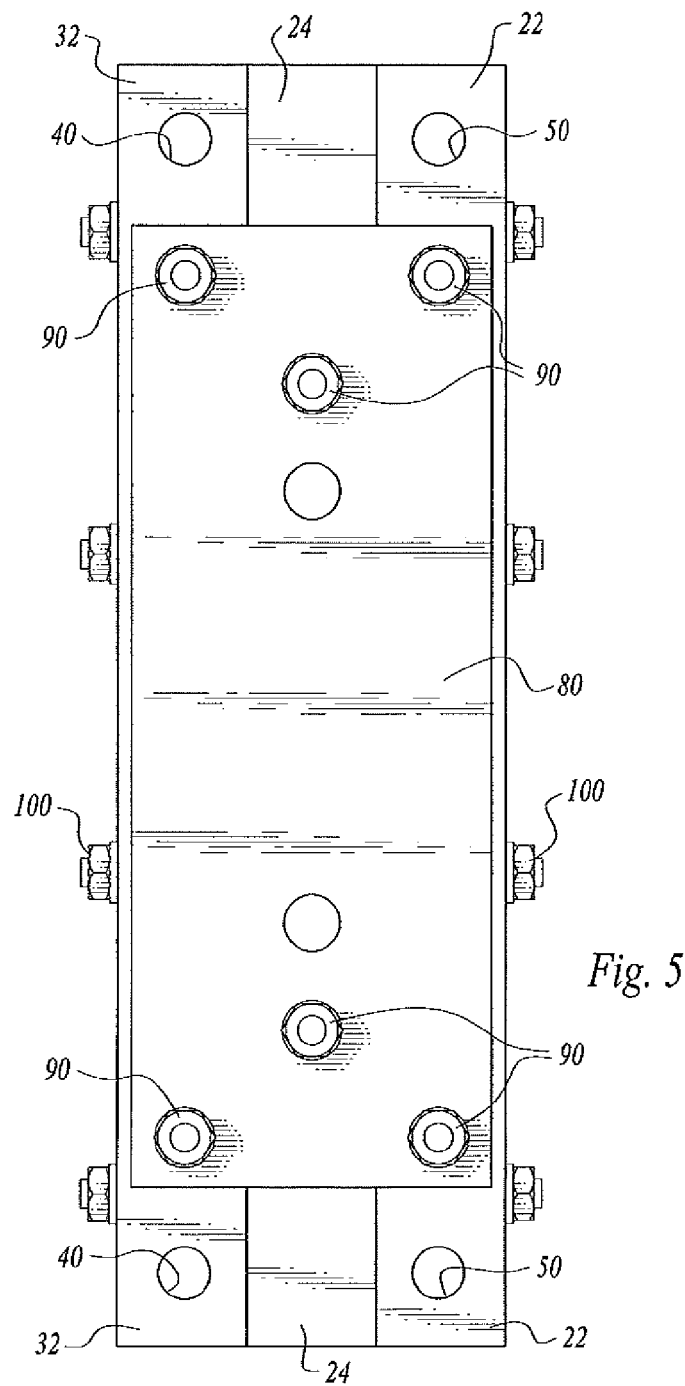
FIG. 5 is a back elevation view of the embodiment of the tri-part water-cooled copper Electroslag or Electrogas welding shoe 10 of FIG. 2, depicting generally a first water-cooled segment 22 having inlet and outlet water manifolds 50, a solid copper central segment 24, a second water-cooled segment 32 having inlet and outlet water manifolds 40, a plurality of copper connector bolts 100 connecting the three segments of the tri-part water-cooled copper Electroslag welding shoe and securing the relative position of each segment to the other two segments, a backing plate 80, a plurality of copper connector bolts 90 connecting the backing plate 80 to the backward faces of the three segments of the tri-part water-cooled copper Electroslag welding shoe 10.
Figure 6:
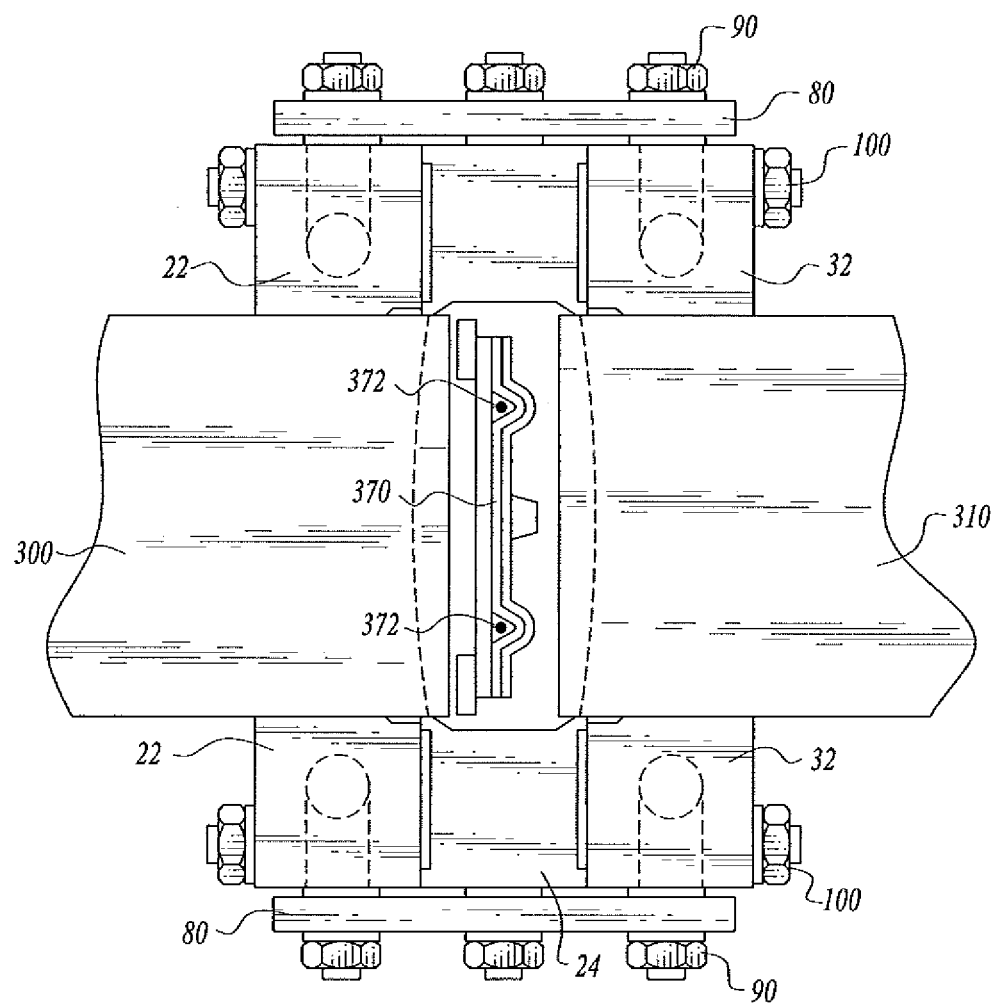
FIG. 6 is a top view of an Electroslag or Electrogas weld, illustrating an embodiment of two tri-part water-cooled copper Electroslag welding shoes 10, on either side of the ESW-NG weld cavity. The two-wire 372 insulated, VertaSlag® consumable guide tube 370 is located in the ESW-NG weld cavity between the two steel plates, 300 and 310, being joined together with the Electroslag or Electrogas welding process.
Figure 10:
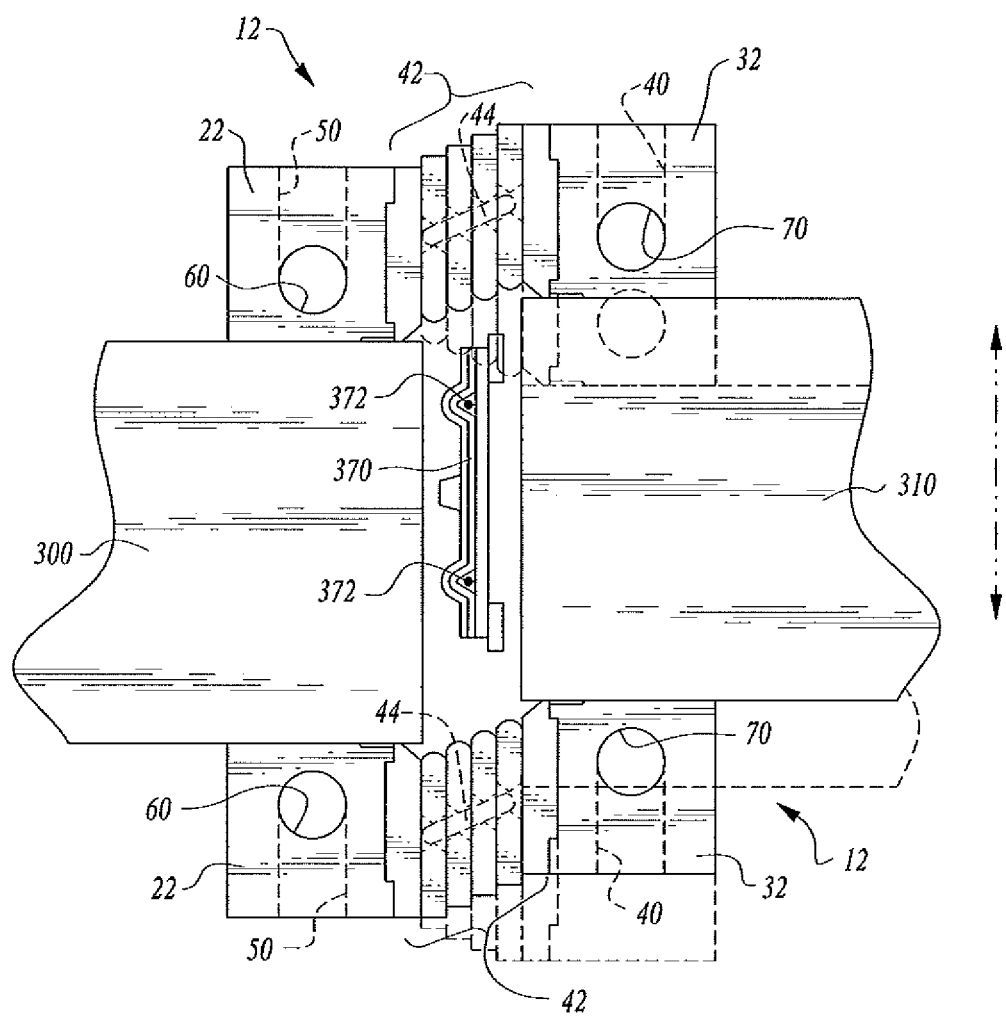
FIG. 10 is a top view of an Electroslag or Electrogas weld, illustrating an embodiment of two tri-part flex water-cooled copper Electroslag or Electrogas welding shoes 12 of FIG. 7, on either side of the ESW-NG weld cavity. The two-wire 372 insulated, VertaSlag® consumable guide tube 370 is located between the two steel plates, 300 and 310, being joined together with the Electroslag or Electrogas welding process. The tri-part flex shoe 12 is designed to fit tightly against two "miss-matched sections of parent material being joined together 300 and 310, and yet let the center portion elements 42 flex in the X axis, the Y axis, and the Z axis to keep the shoe 12 aligned with the weld joint, while simultaneously keeping the water-cooled end portions 22 and 32 of the shoe 12 in close contact with the parent material 300 and 310 to reduce the size of the HAZ and reduce base metal dilution.

Referring more specifically to the drawings, for illustrative purposes the apparatus for tri-part and tri-part flex water-cooled copper shoes for application in Electroslag and Electrogas welding systems and methods is embodied generally in FIGS. 2-15. It will be appreciated that the systems may vary as to configuration and as to the details of the parts, and that the methods of using the systems may vary as to details and to the order of steps, without departing from the basic concepts as disclosed herein. The apparatus for the tri-part and tri-part flex water-cooled Electroslag and Electrogas welding shoes for application in Electroslag and Electrogas welding systems and methods are disclosed generally in terms of welding Butt-Welds for heavy plate splicing, as this particular type of welding operation widely used. However, the disclosed apparatus for the tri-part shoe and tri-part flex water-cooled Electroslag welding shoes may be used in a large variety of Electroslag and or Electrogas welding applications, as will be readily apparent to those skilled in the art.

The Arcmatic® tri-part water-cooled copper Electroslag and Electrogas welding shoes (hereafter referred to as the "tri-part shoe"), and for the tri-part articulated water-cooled copper Electroslag welding shoes (hereafter referred to as the "tri-part flex shoe"), use water-circulation to cool the two outer sections, 22 and 32, of the tri-part shoe 10 and the tri-part flex shoe 12 and conductive cooling to remove heat from the center section 24 of the tri-part shoe 10, FIGS. 2-6, and the center tri-part flex shoe segments 42 of the tri-part flex shoe 12, FIGS. 7-13, as the weld puddle progresses vertically upward. The two outer sections, 22 and 32, of the tri-part shoe and the tri-part flex shoe come into intimate contact with the two pieces of parent material, 300 and 310, being joined together with the ESW-NG welding process, and the center section 24 of the tri-part shoe 10 and the tri-part flex shoe 12 only comes in contact with the molten Electroslag weld puddle, FIGS. 1, 1A, 6 and 10.

The tri-part flex shoe 12 is designed to fit tightly against two "miss-matched" sections of parent material being joined together, and yet let the multi-part center sections flex in both the X axis, the Y axis, and the Z axis to keep the shoe aligned with the weld joint, while at the same time keeping the water-cooled sections, 22 and 32, of the shoe in close contact with the parent material, 300 and 310, to reduce the size of the HAZ and reduce base metal dilution. For an embodiment of the tri-part water-cooled welding shoes 10 for Electroslag or Electrogas welding systems depicted generally in FIGS. 2-6, each tri-part water-cooled shoe provides two water-cooled welding shoe end portions 22 and 32 having substantially equal lengths, widths, and depths, one to the other, and each end portion further comprising one copper buss bar comprising a forward face and a backward face, wherein each copper bus bar further comprises i) a dual flow water channel comprising an upper section and a lower section, ii) at least one water flow manifold 50 and 40, respectively, communicating with the dual flow water channel upper section and lower section, and a copper shoe plug capping each dual flow water channel upper section and lower section 60 and 70, FIGS. 2-6. The temperature of each water-cooled welding shoe end portion 22 and 32 is maintained at a temperature range of between 150 degrees Fahrenheit to 200 degrees Fahrenheit during the Electroslag or Electrogas welding operation. All channels, manifolds, and plugs of each water-cooled welding shoe end portion 22 and 32 are fusion welded with electron beam fusion welds.

The embodiment of the tri-part water-cooled welding shoes for Electroslag or Electrogas welding systems depicted generally in FIGS. 2-6 further includes at least one welding shoe center portion 24, each center portion 24 having a length and depth substantially equal to the length and depth of the at least two water-cooled welding shoe end portions 22 and 32, and further comprising at least one solid copper bus bar comprising a forward face and a backward face. The temperature of each water-cooled welding shoe center portion 24 is maintained at a temperature range of between 200 degrees Fahrenheit to 1000 degrees Fahrenheit during the Electroslag or Electrogas welding operation.

The embodiment of the tri-part water-cooled welding shoes for Electroslag or Electrogas welding systems depicted generally in FIGS. 2-6 provides water-cooled welding shoe end portions 22 and 32 and the welding shoe center portion 24 connected by a plate 80 on the backward faces of the welding shoe, the plate 80 secured to the welding shoe center portion 24 and into to the at least two water-cooled welding shoe end portions 22 and 32 by copper bolts 90, and the assembly is further a plurality of copper bolts 100 through the at least one welding shoe center portion 24 and the at least two water-cooled welding shoe end portions 22 and 32.

Figure 14:
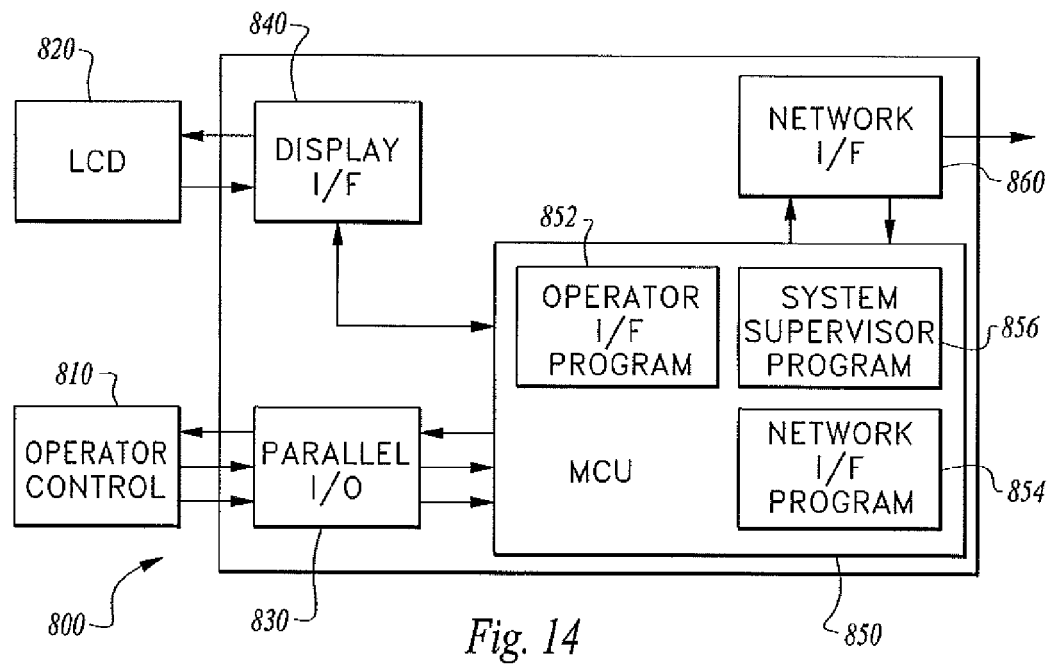
FIG. 14 is schematic of the distributed welding control system 800 for the ESW and ESW-NG welding method and system, including control over the temperature control of the embodiments of air cooled copper shoes, 10 and 200, including the operator's control panel 810 and liquid crystal display (LCD) 820, parallel input and output unit 830, display interface 840, microprocessor control unit 850, operator interface program 852, network interface program 854, system supervisor program 856, and network interface 860.
Figure 15:
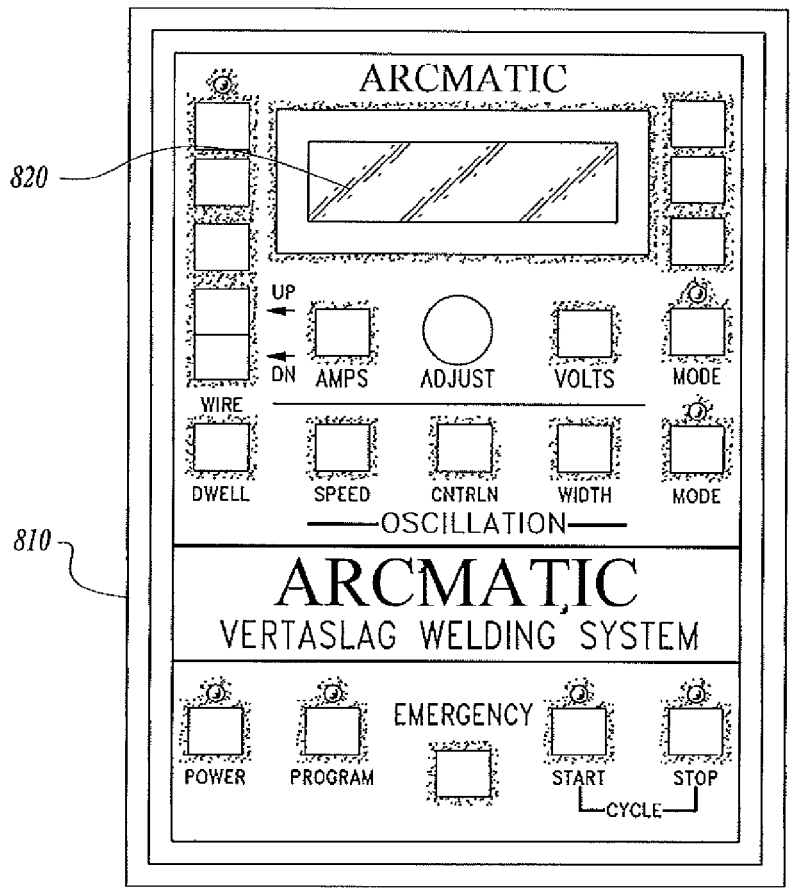
FIG. 15 is a planar view of the face of the operator control panel 810 of the distributed welding control system 800 of FIG. 15, including the liquid crystal display ("LCD") 820.

The embodiment of the tri-part water-cooled welding shoes 10 for Electroslag or Electrogas welding systems depicted generally in FIGS. 2-6 further includes at least one distributed control system having at least one controller module for regulating a countercurrent flow of water through the manifolds and water flow channels of each water-cooled cooper welding shoe end portion, FIGS. 14-15.

An embodiment of the tri-part flex water-cooled copper shoes 12, FIGS. 7-13, includes a welding shoe center portion having a plurality of center portion elements 42, that include two uniformly sized center portion end elements 43 and a plurality of uniformly sized center portion center elements 45, wherein each center portion end element 43 has a rectangular side extension size to be received and held by a rectangular recess within a water-cooled welding shoe end portion 22 or 32 side and a chamfered edge 47 on a center portion end element 43 forward face. The plurality of center portion center elements 45 comprise dual bores 46, each bore 46 spaced equidistant from an end of each uniformly sized center element 45 and sized to receive and be positionally held by a pin or rod 44 sized to reside in the bores 46 for the entire width of the plurality of uniformly sized center portion center elements 45, FIGS. 7, 9 and 12. As such, the center portion elements 42 are positionally variable in three-dimensions with respect to the water-cooled welding shoe end portions 22 and 32. In this manner, the tri-part flex shoe 12 is designed to fit tightly against two "miss-matched" sections of parent material being joined together 300 and 310, and yet yet the center portion elements 42 flex in the X axis, the Y axis, and the Z axis to keep the shoe 12 aligned with the weld joint, while simultaneously keeping the water-cooled end portions 22 and 32 of the shoe 12 in close contact with the parent material 300 and 310. This flexibility of the center portion elements 42 serves to reduce the size of the HAZ and reduce base metal dilution. The resultant tight fit of the tri-part flex shoe 12 also allows the two water-cooled end portions 22 and 32 of the tri-part flex shoe 12 to saddle against any "miss-matched" parent material 300 and 310 plates preventing leakage of the molten, 3500 degrees Fahrenheit Electroslag or Electrogas flux puddle during the Electroslag and Electrogas welding operation.

Figure 11:
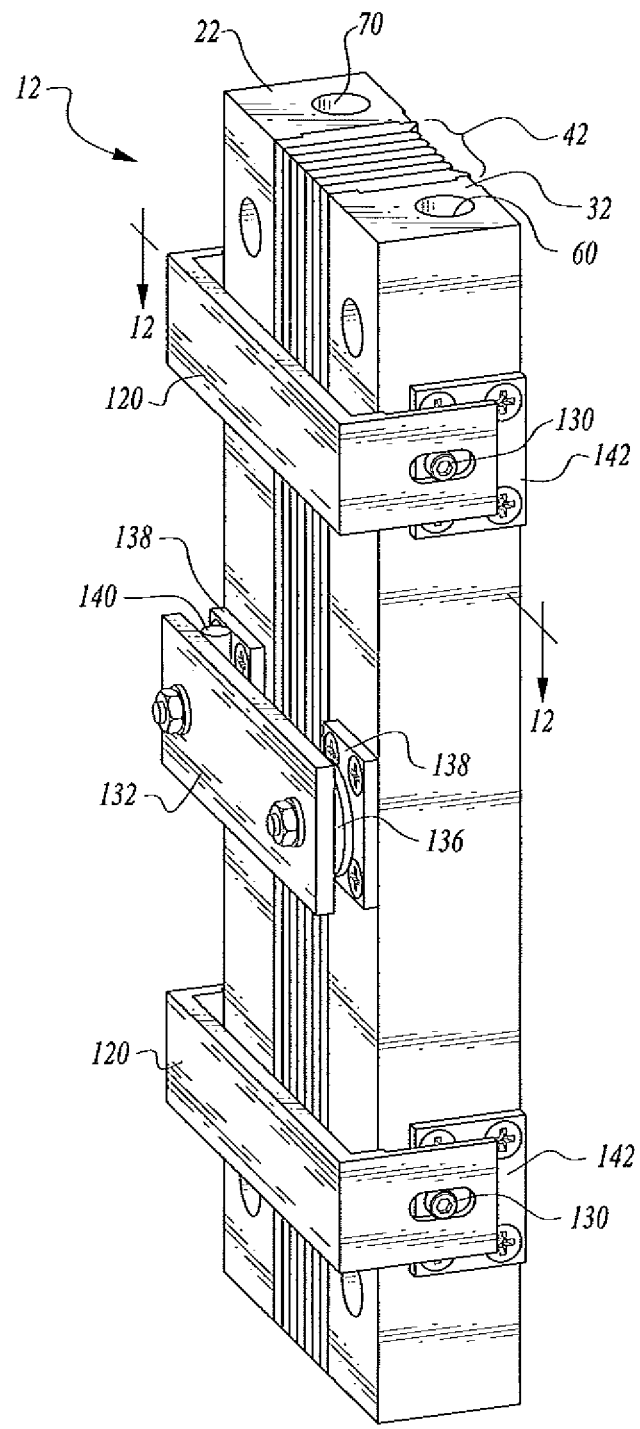
FIG. 11 is a rear top perspective view of an embodiment of the tri-part flex water-cooled copper Electroslag or Electrogas welding shoes 12 of FIG. 7, depicting the addition of two brackets 120 attached on the exterior ends of the water-cooled welding shoe end portions 22 and 32 and extending around the center portion 42 backward face, each bracket 120 comprising two positionally adjustable copper bolt assemblies 130, 140 communicating with the exterior ends of the water-cooled welding shoe end portions 22 and 32, and further depicting the addition of a separate third water-cooled welding shoe end portion adjustable bracket 132 and copper bolt assembly across the backward face of the water-cooled welding shoe end portions 22 and 32 at a point nearly equidistant from the two brackets 120 attached on the exterior ends of the water-cooled welding shoe end portions 22 and 32 and extending around the center portion 42 backward face allowing for lockable three-dimensional positions of the water-cooled welding shoe center portions 42 with respect to the water-cooled welding shoe end portions 22 and 32.
Figure 12:
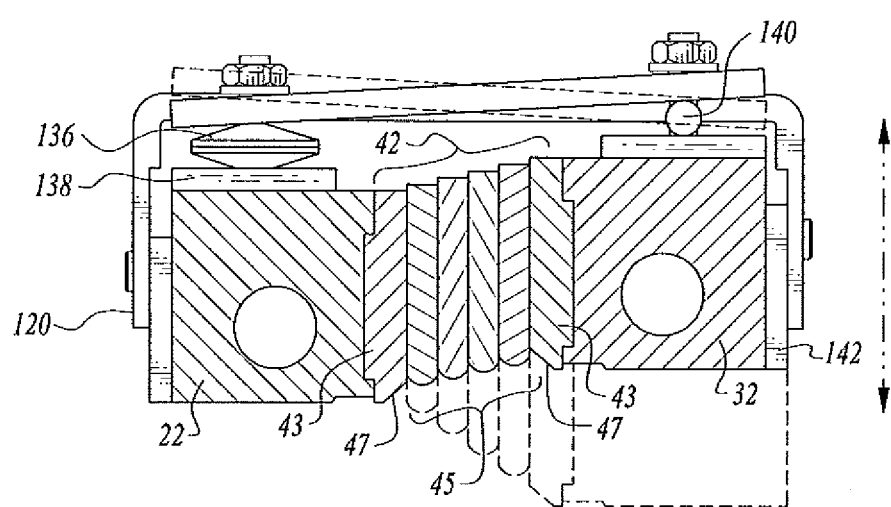
FIG. 12 is a top sectional view of an embodiment of the tri-part flex water-cooled copper Electroslag or Electrogas welding shoes 12 of FIG. 11 taken at "12-12", depicting the bottom bracket 120 attached on the exterior ends of the water-cooled welding shoe end portions 22 and 32 and extending around the center portion end element backward face, each bracket comprising two positionally adjustable copper bolt assemblies 142 communicating with the ends of the water-cooled welding shoe end portions 22 and 32, and a view of a pivot member 140 and spring loaded disk member 136 of the separate third water-cooled welding shoe end portion adjustable bracket across the backward face of the water-cooled welding shoe end portions at a point nearly equidistant from the two brackets attached on the exterior ends of the water-cooled welding shoe end portions and extending around the center portion end element backward face allowing for lockable three-dimensional positions of the water-cooled welding shoe center portions 42 with respect to the water-cooled welding shoe end portions 22 and 32. The plurality of solid copper flex shoe segments 42 that include two uniformly sized center portion end elements 43 and a plurality of uniformly sized center portion center elements 45, wherein each center portion end element 43 has a rectangular side extension size to be received and held by a rectangular recess within a water-cooled welding shoe end portion to 22 or 32 side and a chamfered edge 47 on a center portion end element 43 forward face, and wherein the plurality of center portion center elements 45 comprises dual bores 46, each bore 46 spaced equidistant from an end of each uniformly sized center element 45 and sized to receive and be positionally held by a pin or rod 44 sized to reside in the bores for the entire width of the plurality of uniformly sized center portion center elements 45, whereby the center portion elements 42 are positionally variable in three-dimensions with respect to the water-cooled welding shoe end portions 22 and 32.
Figure 13:
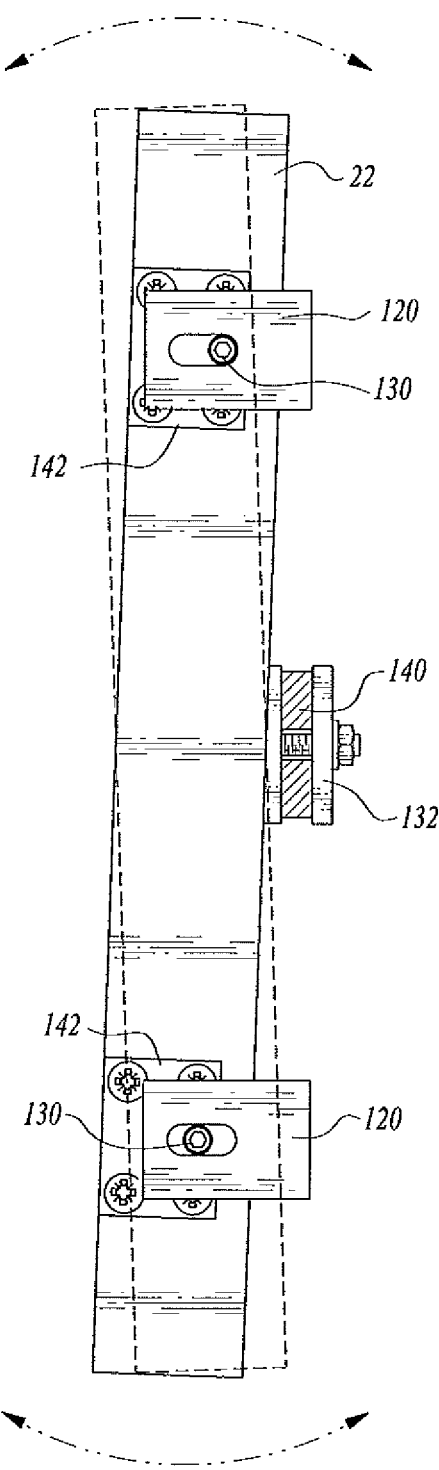
FIG. 13 is a side elevation view of the tri-part flex water-cooled copper Electroslag or Electrogas welding shoes 12 of FIG. 11.

An embodiment of the tri-part flex water-cooled copper shoes 12 provides two brackets 120 attached on the exterior ends of the water-cooled welding shoe end portions 22 and 32, extending around the center portion element 42 backward face, each bracket including two positionally adjustable copper bolt assemblies 130 and 142 communicating with the exterior ends of the water-cooled welding shoe end portions 22 and 32, FIGS. 11-13. The embodiment of the tri-part flex water-cooled copper shoes 12 further includes a separate, third water-cooled welding shoe end portion adjustable bracket 132 with copper bolt assembly across the backward faces of the water-cooled welding shoe end portions, at a point nearly equidistant from the two brackets 120 attached on the exterior ends of the tri-part flex water-cooled welding shoe 12 end portions 22 and 32, and the backward faces of center portion elements 42 allowing for lockable three-dimensional positions of the water-cooled welding shoe center portion elements 42 with respect to the water-cooled welding shoe end portions 22 and 32 using a combined pivot member 140 and spring-loaded disk members 136 communicating with the water-cooled end portion 22 and 32 backward faces, FIG. 12, allowing the tri-part flex water-cooled welding shoe 12 to flex in three dimensions to compensate for any dimensional variations in the alignment of parent material being joined together 300 and 310, FIGS. 10-13.

During the Electroslag and Electrogas welding process, the two water-cooled sections, 22 and 32, of the Arcmatic® tri-part water-cooled copper Electroslag and Electrogas welding shoes 10, and the tri-part flex water-cooled copper Electroslag and Electrogas welding shoes 12, remain below 200° Fahrenheit. These two sections of the tri-part shoe provide conductive cooling for the center section of the shoe. The center sections, 24 and 42, heat up to a temperature range from approximately 200° Fahrenheit to 1000° Fahrenheit—while always remaining well below the melting temperature of copper. This differential in temperature between the outer sections of the shoe and the inner section(s) of the shoe allows the two water-cooled sections, 22 and 32, to draw heat from the parent material, while allowing the center section, 24 and 42, of the shoe to heat up. This heating action allows the molten Electroslag and Electrogas welding puddle to maintain a temperature that is hot enough to melt the outer portions of the four corners of the weld cavity while the two sections of parent material, 300 and 310, are welded together.

The embodiments of the tri-part water-cooled copper shoes I 0 and the tri-part flex water-cooled copper shoes 12 as herein described and disclosed are both readily adaptable to any vertical Electroslag or Electrogas welding operating using any welding shoe mounting assemblies known in the art such as, without limitation, U-shaped aluminum mounting brackets with a pressure adjusting screw assembly or strongback and wedge bracket assemblies. Similarly, the embodiments of the tri-part water-cooled copper shoes 10 and the tri-part flex water-cooled copper shoes 12 as herein described and disclosed are both readily adaptable to welding shoe sumps an d run-off tabs regularly employed in Electroslag or Electrogas welding operations.

As the center sections, 24 and 42, of the tri-part copper shoes reach a temperature range between 200° Fahrenheit to 1000° Fahrenheit during the welding operation, the welding voltage can be substantially lowered and still attain excellent wetting on the four corners of the parent material, 300 and 310, in the weld cavity without causing any damage to the center sections, 24 and 42. At the same time, the water-cooled outer or end sections, 22 and 32, of the tri-part shoe and the tri-part flex shoe are continually cooling the parent material, 300 and 310, to reduce the size of the HAZ. For example, a reduction of weld voltage from 38-Volts to 30-Volts yields a resultant reduction in total wattage into the parent material of 8000 Watts.

This ability to control and greatly reduce heat reduction provides faster welds, with a smaller HAZ and far less base metal dilution. A weld at 1000-Amps and 38-Volts will produce approximately 50% reduction of base metal dilution, while a weld at 1000-Amps and 30-Volts will produce approximately a 30% reduction of base metal dilution. Lower heat input, faster travel speeds, and lower base metal dilution will result in a smaller grain structure in the weld and a much stronger bond in the fusion zone of the weld.

Accordingly, a method of controlling Electroslag or Electrogas welding applications to reduce weld voltage, decrease Electroslag or Electrogas weld nugget size, and decrease the heat input from the Electroslag or Electrogas welding application into the work piece by means of tri-part water-cooled cooper welding shoes, 10 or 12, in which to a pair of work pieces 300 and 310 located in a vertical welding position and defining an Electroslag or Electrogas weld cavity is imparted at least one pair of tri-part water-cooled cooper welding shoes, 10 or tri-part flex water-cooled cooper welding shoes 12, on either side of the weld cavity is disclosed and described.

The method of controlling Electroslag or Electrogas welding applications to reduce weld voltage, decrease the size of the Electroslag or Electrogas weld nugget and, in turn, decrease the heat input from the Electroslag or Electrogas welding application into the work pieces by means of tri-part water-cooled cooper welding shoes, 10 or tri-part flex water-cooled cooper welding shoes 12, includes the following steps:

a) providing at least two water-cooled welding shoe end portions 22 and 32 comprising substantially equal lengths, widths, and depths, one to the other, and each end portion further comprising one copper buss bar comprising a forward face and a backward face, wherein each copper bus bar further comprises i) a dual flow water channel comprising an upper section and a lower section, ii) at least one electron beam fusion welded or silver brazed one water flow manifold communicating with the dual flow water channel upper section and lower section through the backward face of each of the at least two water-cooled welding shoe end portions, and (iii) an electron beam fusion welded or silver brazed copper shoe plug capping each dual flow water channel upper section and lower section;

b) providing at least one welding shoe center portion 24 or 42, each center portion comprising a length and depth substantially equal to the length and depth of the at least two water-cooled welding shoe end portions, and further comprising at least one solid copper bus bar comprising a forward face and a backward face and two chamfered edges 47 on the ends of the at least one solid copper bus bar forward face;

c) providing adjustable means for securely connecting the at least one welding shoe center portion to the at least two water-cooled welding shoe end portions; and d) providing means for controlling the temperature of the water cooled copper shoes.

The above disclosed and described method of controlling Electroslag or Electrogas welding applications to reduce weld voltage, decrease the size of the Electroslag or Electrogas weld nugget and, in turn, decrease the heat input from the Electroslag or Electrogas welding application into the work pieces by means of the tri-part water-cooled cooper welding shoes 10 or tri-part flex water-cooled cooper welding shoes 12 includes an assembly wherein all channels, manifolds, and plugs are fusion welded with electron beam fusion welds or silver brazed.

The above disclosed and described method of controlling Electroslag or Electrogas welding applications to reduce weld voltage, decrease the size of the Electroslag or Electrogas weld nugget and, in turn, decrease the heat input from the Electroslag or Electrogas welding application into the work pieces by means of tri-part water-cooled cooper welding shoes 10, or tri-part flex water-cooled cooper welding shoes 12, further provides maintaining the temperature of the tri-part water cooled copper shoe end portions 22 and 32 at a temperature range of between 150 degrees Fahrenheit to 200 degrees Fahrenheit during the Electroslag or Electrogas welding operation.

The above disclosed and described method of controlling Electroslag or Electrogas welding applications to reduce weld voltage, decrease the size of the Electroslag or Electrogas weld nugget and, in turn, decrease the heat input from the Electroslag or Electrogas welding application into the work pieces by means of tri-part water-cooled cooper welding shoes, 10 or tri-part flex water-cooled cooper welding shoes 12, further includes at least one distributed control system 800 having at least one controller module for regulating the countercurrent flow of water through the manifolds and water flow channels of each tri-part water-cooled cooper welding shoe end portion, 22 and 32.

The welding process and the welding procedures for tri-part water-cooled copper Electroslag and Electrogas welding shoes 10 or tri-part flex water-cooled copper Electroslag welding shoes 12 including, but not limited to, the "Water-Cooled VertaSlag® Butt Welding Shoe,™" can be pre-programmed into the Arcmatic® programmable, computer controlled integrated welding system, FIGS. 14-15. The Arcmatic® distributed welding control system 800 provides fully automatic control over the water-cooled copper welding shoes and related welding process from the operator's control panel 810. The automated control of the water-cooled copper welding shoes components includes a single pendant controller that provides overall system control for a number of discreet motion control networks including microprocessor modular distributed control of each welding torch, each welding torch slide assembly, air circulation through the copper shoes, each wire feed conduit, each high current welding cable, welding power supply, and each Electroslag and Electrogas weld within each welding cavity through a system supervisor program 856, network interface program 854, and an operator interface program 852 of a microprocessor control unit 850. Accordingly, the welding operator for any disclosed method and system of welding using water-cooled copper shoes principally needs to be a skilled operator capable of setting up the weld and running the pre-qualified welding programs. The same welding control system and methods used for Arcmatic® VertaSlag® welds of the '019 application and/or the '297 application, and/or the '472 patent, the '716 patent, and/or the '159 patent, are used to operate and control the method and system of welding including, but not limited to, automating the water-cooled copper shoes "on the job" in the field.

Therefore, the foregoing is considered as illustrative only of the principles of the invention. Additionally, since numerous modifications and changes will readily occur to those skilled in the art, it is not desired to limit the invention to the exact construction and operation shown and described, and further, all suitable modifications and equivalents may be resorted to, falling within the scope of the invention.

I claim:

1. A water-cooled welding shoe comprising:

a) at least two water-cooled welding shoe end portions comprising equal lengths, widths, and depths, one to the other, and each end portion further comprising one copper buss bar comprising a forward face and a backward face, each copper bus bar further comprising i) a dual flow water channel comprising an upper section and a lower section, ii) at least one water flow manifold machined into the backward face of each water-cooled welding shoe end portion and communicating with the dual flow water channel upper section and lower section, and a copper shoe plug capping each dual flow water channel upper section and lower section;

b) at least one welding shoe center portion, each center portion comprising a length and depth substantially equal to the length and depth of the at least two water-cooled welding shoe end portions, each center portion comprising at least one solid copper bus bar comprising a forward face and a backward face, and each center portion comprising a plurality of center portion elements, the center portion elements comprising two uniformly sized center portion end elements and a plurality of uniformly sized center portion center elements, wherein each center portion end element has a rectangular side extension size to be received and held by a rectangular recess within a water-cooled welding shoe end portion side and a chamfered edge on a center portion end element forward face, and wherein the plurality of center portion center elements each comprise dual bores, each bore spaced equidistant from an end of each uniformly sized center element and sized to receive and be positionally held by a rod sized to reside in the bores for the entire width of the plurality of uniformly sized center portion center elements, whereby the welding shoe center portion is positionally variable in three-dimensions with respect to the water-cooled welding shoe end portions to overcome any miss-matched sections of a parent material being welded together;

c) an adjustable assembly for securely connecting the at least one welding shoe center portion to the at least two water-cooled welding shoe end portions; and d) a welding control system and microprocessor control unit for controlling the temperature of the water-cooled copper shoe.

2. The water-cooled welding shoe of claim 1, wherein the adjustable assembly for securely connecting the at least one welding shoe center portion to the at least two water-cooled welding shoe end portions comprises two brackets attached on the exterior ends of the water-cooled welding shoe end portions and extending around the center portion end element backward face, each bracket comprising two positionally adjustable bolt assemblies communicating with the backward face of the water-cooled welding shoe end portions, and further comprising a separate third water-cooled welding shoe end portion adjustable bracket across the backward face of the water-cooled welding shoe end portions at a point nearly equidistant from the two brackets attached on the exterior ends of the water-cooled welding shoe end portions and extending around the center portion end element backward face allowing for lockable three-dimensional positions of the water-cooled welding shoe center portions with respect to the water-cooled welding shoe end portions.

3. The water-cooled welding shoe of claim 1, wherein the welding control system and microprocessor control unit for controlling the temperature of the water-cooled copper shoe comprises at least one distributed control welding system having at least one microprocessor unit for regulating countercurrent flow of water through the manifolds and water flow channels of each the water-cooled welding shoe.

4. The water-cooled welding shoe of claim 3, wherein the temperature of each water-cooled welding shoe end portion is maintained at a temperature range of between 150 degrees Fahrenheit to 200 degrees Fahrenheit during operation of an electroslag or electrogas welding system.

5. The water-cooled welding shoe of claim 3, wherein the temperature of each water-cooled welding shoe center portion is maintained at a temperature range of between 200 degrees Fahrenheit to 1000 degrees Fahrenheit during operation of an electroslag or electrogas welding system.

6. The water-cooled welding shoe of claim 1, wherein the adjustable assembly for securely connecting the at least one welding shoe center portion to the at least two water-cooled welding shoe end portions comprises a plate on the backward faces of the welding shoe, the plate bolted into the at least one welding shoe center portion and into to the at least two water-cooled welding shoe end portions, and further comprises a plurality of bolts through the at least one welding shoe center portion and the at least two water-cooled welding shoe end portions.

7. The water-cooled welding shoe of claim 1, wherein all channels, manifolds, and plugs are fusion welded with electron beam welds.

8. A tri-part, water-cooled welding shoe comprising:

a) at least two water-cooled welding shoe end portions comprising equal lengths, widths, and depths, one to the other, and each end portion further comprising one copper buss bar comprising a forward face and a backward face, wherein each copper bus bar further comprises i) a dual flow water channel comprising an upper section and a lower section, ii) at least one water flow manifold communicating with the dual flow water channel upper section and lower section through the backward face of each of the at least two water-cooled welding shoe end portions, and (iii) a copper shoe plug capping each dual flow water channel upper section and lower section;

b) a plurality of center portion elements comprising two uniformly sized center portion end elements and a plurality of uniformly sized center portion center elements, wherein each center portion end element has a rectangular side extension size to be received and held by a rectangular recess within a water-cooled welding shoe end portion side and a chamfered edge on a center portion end element forward face, and wherein the plurality of center portion center elements comprises dual bores, each bore spaced equidistant from an end of each uniformly sized center element and sized to receive and be positionally held by a rod sized to reside in the bores for the entire width of the plurality of uniformly sized center portion center elements, whereby the center portion is positionally variable in three-dimensions with respect to the water-cooled welding shoe end portions;

c) two brackets attached on the exterior ends of the water-cooled welding shoe end portions and extending around the center portion end element backward face, each bracket comprising two positionally adjustable bolt assemblies communicating with the backward face of the water-cooled welding shoe end portions, and further comprising a separate third water-cooled welding shoe end portion adjustable bracket across the backward face of the water-cooled welding shoe end portions at a point nearly equidistant from the two brackets attached on the exterior ends of the water-cooled welding shoe end portions and extending around the center portion end element backward face allowing for lockable three-dimensional positions of the water-cooled welding shoe center portions with respect to the water-cooled welding shoe end portions;

d) at least one welding control system and microprocessor control unit for controlling the countercurrent flow of water through the manifolds and water flow channels of each of the at least two water-cooled welding shoe end portions for controlling the temperature of the water cooled copper shoe end portions at a temperature range of between 150 degrees Fahrenheit to 200 degrees Fahrenheit and the plurality of center portion elements at a temperature range of between 200 degrees Fahrenheit to 1000 degrees Fahrenheit during operation of an electroslag or electrogas welding system.

* * * * *